United States Patent [19]

Park et al.

[11] Patent Number: 5,166,305
[45] Date of Patent: Nov. 24, 1992

[54] AROMATIC POLYSULFONEETHERKETONE POLYMERS

[75] Inventors: Jong W. Park, Seoul; In T. Lee, Suwon, both of Rep. of Korea

[73] Assignee: Korea Institute of Science and Technology, Seoul, Rep. of Korea

[21] Appl. No.: 638,318

[22] Filed: Jan. 4, 1991

[30] Foreign Application Priority Data

Feb. 2, 1990 [KR] Rep. of Korea ............... 90-1238

[51] Int. Cl.$^5$ ............... C08G 8/02; C08G 14/00; C08G 65/40
[52] U.S. Cl. ............... 528/125; 528/126; 528/128; 528/171; 528/174; 528/175; 528/219; 528/220
[58] Field of Search ............... 528/125, 126, 128, 171, 528/174, 175, 219, 220

[56] References Cited

U.S. PATENT DOCUMENTS

| | | | |
|---|---|---|---|
| 4,065,437 | 12/1977 | Blinne et al. | 528/125 |
| 4,108,837 | 8/1978 | Johnson et al. | 528/125 |
| 4,176,222 | 11/1979 | Cinderey et al. | 528/126 |
| 4,320,224 | 3/1982 | Rose et al. | 528/125 |
| 4,339,568 | 7/1982 | Maresca | 528/126 |

FOREIGN PATENT DOCUMENTS

| | | |
|---|---|---|
| 63-30527 | 2/1988 | Japan. |
| 1153035 | 5/1969 | United Kingdom. |
| 1153527 | 5/1969 | United Kingdom. |
| 1177183 | 1/1970 | United Kingdom. |

OTHER PUBLICATIONS

Attwood, et al "Synthesis & Properties of Polyaryletherketones", Polymer, 1981, vol. 22, Aug. pp. 1096-1103.
Abstract of Japanese Patent No. 63-30527, to Tanabe et al., dated Feb. 9, 1988, entitled "Manufacture of aromatic polyether block copolymers".

Primary Examiner—John Kight, III
Assistant Examiner—P. Hampton-Hightower
Attorney, Agent, or Firm—Merchant, Gould, Smith, Edell, Welter & Schmidt

[57] ABSTRACT

Novel aromatic polysulfoneetherketone polymers having recurring units of Formula:

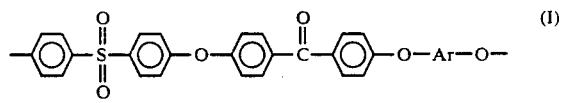

(I)

wherein Ar is phenylene, biphenylene or

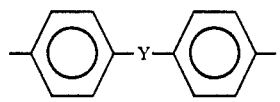

in which —Y— represents

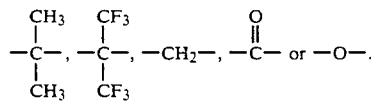

The aromatic polysulfoneetherketone polymers of the invention have superior properties over the known polysulfone or polyetherketone series polymers in terms of heat resistance, chemical resistance and electric insulation as well as mechanical properties such as dimensional stability.

13 Claims, No Drawings

AROMATIC POLYSULFONEETHERKETONE POLYMERS

BACKGROUND OF THE INVENTION

1. Field of the Invention

The present application relates to novel aromatic polysulfoneetherketone polymers having recurring units of Formula:

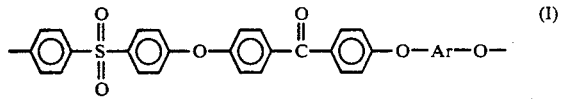 (I)

wherein Ar is phenylene, biphenylene or

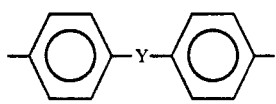

in which —Y— represents

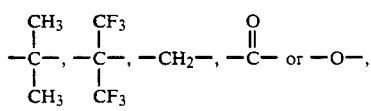

and a process for preparing the same.

2. Description of the Prior Art

The specialty engineering plastics of polysulfone and polyetherketone series are excellent over the conventional, general purpose engineering plastics in terms of heat resistance (i.e. a high glass transition temperature, Tg, and a high thermal distortion temperature), chemical resistance and electrical insulation, and have excellent mechanical properties such as dimensional stability. These characteristics make it possible to utilize the specialty engineering plastic materials in various fields of industry such as electric, electronic, mechanical, aircraft, and medical supply-making industries.

The specialty engineering plastics are usually prepared by a method of condensation polymerization which comprises condensing an aromatic dihalide with an aromatic diol in a polar solvent having a high boiling point, such as dimethylacetamide, cyclotetramethylenesulfone (sulfolan), etc. For example, U.K. Patent No. 1,078,234 and U.S. Pat. No. 4,108,837, both to Union Carbide Corporation, U.S.A., disclose a process for producing polysulfone polymers which are commercially available under the trade name Udel ®. U.K. Patent Nos. 1,153,035 and 1,177,183 to ICI, U.K., disclose a process for producing polyethersulfone polymers (trade name: Victrex ®). U.S. Pat. No. 4,320,224 to ICI of U.K. discloses a process for producing polyetheretherketone polymers (trade name: Victrex ®).

It has been known that the polysulfone and polyethersulfone polymers are an amorphous substance having good heat resistance, steam resistance, electric insulation, transparency and film formability. But, they are inferior to the polyetherketone series in view of the mechanical properties. Due to these properties, these polymers are not utilized as a structural material but for parts such as connectors for electric and electronic products, battery cases, food packing containers, medical sterilizers, ultrafitration membranes, etc.

In contrast, crystalline polyetheretherketone and polyetherketone polymers are used as matrix resins for advanced composite materials for use in the aircraft because of their excellent chemical resistance, heat resistance, and other mechanical properties such as dimensional stability. However, these types of polymers have high melting point and low solubility; thus, they can be processed only by means of compression molding or extrusion molding.

SUMMARY OF THE INVENTION

A primary object of the invention is to provide novel polysulfoneetherketone polymers in which the physical properties of the two types of engineering plastics mentioned above have been optimized.

Another object of the invention is to provide a process for the preparation of the same polymers.

These and other objects of the present invention can be achieved by providing a novel polysulfoneetherketone polymer which comprises the recurring units of Formula:

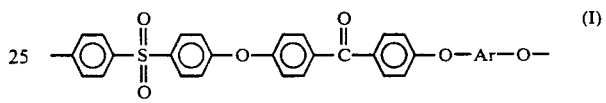 (I)

wherein Ar is phenylene, biphenylene or

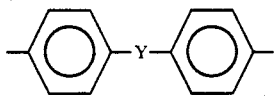

in which —Y— represents

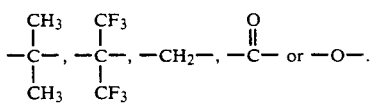

DETAILED DESCRIPTION OF THE INVENTION

The present invention provides novel aromatic polysulfoneetherketone polymers of Formual I above, which is an alternating copolymers consisting of polysulfone, polyarylethersulfone or polyethersulfone units, and polyetherketone or polyetheretherketone units.

The aromatic polysulfoneetherketone polymers of Formula I can be prepared by the codensation reaction of equivalent amounts of 4-halo-4'-(4-halobenzoylphenyloxy)diphenylsulfone of the Formula:

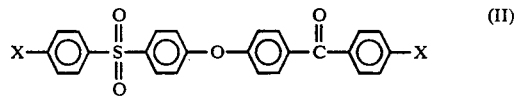 (II)

wherein X is chlorine or fluorine and an aromatic diolate of Formula:

 (III)

wherein M is an alkali metal in a polar solvent.

The aromatic dihalide of Formula II can be synthesized by improving the process disclosed in Polymer, 1988, 29, p.p. 358-369, in which molar amounts of dihalodiphenylsulfone and 4-fluoro-4'-hydroxybenzophenone are reacted in a polar solvent.

The aromatic diolate of Formula III used in the process of the present invention can be obtained by reacting an aromatic diol compound such as hydroquinone, 4,4'-biphenol, 2,2-bis(4-hydroxyphenyl)propane, 2,2-bis(4-hydroxyphenyl)hexafluoropropane, bis(4-hydroxyphenyl)methane, 4,4'-dihydroxybenzophenone or bis(4-hydroxyphenyl)ether with an alkali metal in the presence of a polar solvent.

Any of polar solvents having a high boiling point such as dimethylsulfoxide, sulfolan, N,N'-dimethylacetamide, diphenylsulfone, N-methylpyrrolidone and the like can be used as the solvent for the polymerization. However, preferably, dimethylsulfoxide, sulfolan or diphenylsulfone is used.

The alkali metal base for use in the production of the aromatic diolate can be selected from the group consisting of sodium hydroxide, potassium hydroxide and potassium carbonate. However, in the case of using sodium or potassium hydroxide, the amount of the base to be used in the reaction with the aromatic diol must be coincided with the equivalent amount in order to give a polymer having a high molecular weight. The reaction utilizing sodium or potassium hydroxide in nature is accompanied by the formation of water which should be distilled off. For these reasons, it is advantageous to use, as the base, potassium carbonate which does not affect the polymerization even if an excessive amount of the base with respect to the aromatic diol is used (Polymer, 1984, 25, p. 1827).

The amount of potassium carbonate is preferred to be used in excess of 1.0 to 20% against the weight of the aromatic diol used.

The water formed during the production of the aromatic diolate of Formula III is removed by distillation in the course of polymerization. However, it is preferred to adjust the content of water within the reactor to 0.5 % by weight or below based on the weight of aromatic diolate.

The reaction temperature is dependent on the type of the organic solvent used and preferably ranges from 140° to 250° C. The reaction is preferably carried out within 1 to 12 hours.

The novel aromatic polysulfoneetherketone polymers resulted from the process of the present invention exist in amorphous form. The resultant polymers is pale yellowish powder and have a superior thermal stability. The micro-structure and the thermal properties are identified by means of the X-ray diffractometer, the differential scanning calorimeter and the thermogravimeter.

DESCRIPTION OF THE PREFERRED EMBODIMENT

The invention will be illustrated in greater detail by way of the following examples The examples are presented for illustrative purposes and should not be construed as limiting the invention which is properly delineated in the claims.

EXAMPLE 1

In a 250 ml four-way flask equipped with a temperature controller, a water cooling condenser, a stirrer and a DeanStark trap, 16.86 g (7.80×10$^{-2}$M) of 4-fluoro-4'-hydroxybenzophenone, 19.83 g (7.80×10$^{-2}$M) of 4-fluorophenylsulfone, 80 ml of sulfolan and 6.21 g (4.49×10$^{-2}$M, 15% in excess) of potassium carbonate were placed. Then, the mixture was reacted under a nitrogen atmosphere at 160° C. for 6 hrs. Upon completion of the reaction, chloroform was added to the reaction solution in an amount of 5 times of the weight of the solution to remove the resulting salt. The resultant was then precipitated in methanol (5 times of the weight of the reaction solution). The resultant was washed three times with hot water and methanol in turn and dried in a vacuum at 100° C. for 24 hrs. The resulting white solid was recrystallized from toluene to give a pure 4-fluoro-4'-(4-fluorobenzoylphenyloxy)diphenylsulfone (Formula II).

Yield: 95%; m.p.: 158°-159° C.

EXAMPLE 2

To a 100 ml tour-way flask equipped with a temperature controller, a water cooling condenser, a stirrer and a DeanStark trap were introduced 5.76 g (1.28×10$^{-2}$M) of 4-fluoro-4'-(4-fluorobenzoylphenyloxy)diphenylsulfone produced in Example 1, 2.92 g (1.28×10$^{-2}$M) of 2,2-bis(4-hydroxyphenyl)propane, 2.03 g (1.47×10$^{-2}$M, 15% in excess) of potassium carbonate and 27 ml of sulfolan. The mixture was subjected to condensation reaction under a nitrogen atmosphere at 160° C. for 6 hrs. After completing the reaction, the salt formed during the reaction was removed by adding chloroform in an amount of 5 times of the weight of the reaction solution and then filtering. The resultant was precipitated in methanol to give a polymer, which was washed with hot water and methanol in turn to remove the remainder of the salt. Drying in a vacuum at 100° C. for 24 hrs. resulted in a pure polymer.

The yield and the reduced viscosity (measured at a concentration of 0.5 g/100 ml at 25° C. using chloroform as a solvent) of the polymer thus obtained were 89 % and 0.6, respectively. Analysis of the polymer with the X-ray diffractometer showed its amorphous structure. Tg of the same polymer was about 163° C.

The polymer was easily processed into a film by means of the solvent casting. The film thus produced has a superior transmittance and thermal stability.

The resulting polymer is an alternating copolymer having a polysulfone and a polyetherketone repeated and has the recurring units of the formula:

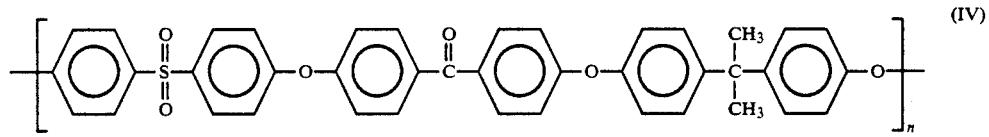

(IV)

EXAMPLE 3

To a 250 ml four-way flask equipped with a temperature controller, a water cooling condenser, a stirrer and a DeanStark trap were introduced 2.92 g (1.28×10$^{-2}$M) of 2,2-bis(4-hydroxyphenyl) propane, 2.84 g (2.56×10⁻²M) of a 50.5 wt % aqueous solution of potassium hydroxide, 30 ml of dimethyl sulfoxide and 90 ml of chlorobenzene. The mixture was allowed to react under a nitrogen atmosphere at room temperature for 30 min. Further reaction at 80° C. for an hour gave a potassium salt of 2,2-bis(4-hydroxyphenyl)propane. The water formed during the reaction was removed by azeotropic distillation with chlorobenzene at 120° to 140° C. to adjust the water content to 0.5 by weight or below. After cooling of the resulting salt solution to room temperature, 5.76 g (1.28×10⁻²M) of 4-fluoro-4'-(4-fluoro-benzoylphenyloxy) diphenylsulfone was added and the mixture allowed condensation reaction at 160° C. for 6 hrs. The subsequent separation procedures for yielding polymers were performed in the same manner as described in Example 2. The reduced viscosity and the yield of the polymer obtained were 0.5 and 85%, respectivly.

This example was carried out to compare the effects of potasium hydroxide and potassium carbonate on the production of aromatic diolate. However, no significant effects on the physical properties of the resulting polymer were observed, except for the complicatedness of the polymerization procedure, as compared with Example 2.

EXAMPLE 4

The same procedure as in Example 2 was repeated, except that the polymerization was conducted at 220° C. and that as the aromatic diol, hydroquinone was used in place of 2,2-bis(4hydroxyphenyl)propane. After completion of the polymerization, the polymerized solution was cooled at 5020 C. The salt formed during the reaction was removed by precipitation of the solution into water (5 times of the amount of the solution reacted). The resulting polymer was washed two or three times with hot water and methanol in turn and dried in a vacuum at 100° C. for 24 hrs. to give a pure polymer. Yield: 87%, Reduced Viscosity: 0.4, Tg: 165° C.

The polymer is an alternating copolymer having a polyethersulfone and a polyetheretherketone repeated and has the recurring units of Formula:

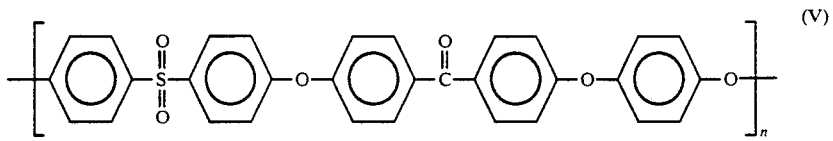
(V)

EXAMPLE 5

The same procedure as in Example 2 was repeated, except that 4,4'-biphenol was used as the aromatic diol in place of 2,2-bis(4-hydroxyphenyl)propane and that the polymerization was conducted at 220° C. Yield: 82%, Reduced Viscosity: 0.3, Tg: 200° C.

The resulting polymer is an alternating copolymer in which a polyarylethersulfone and a polyetherketone are repeated and has the recurring units of Formula:

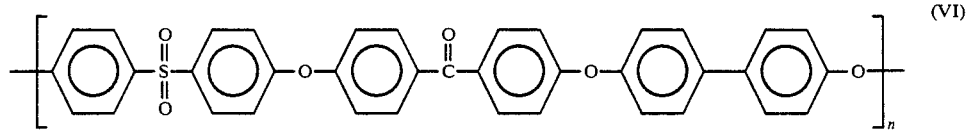
(VI)

What is claimed is:

1. Polysulfoneetherketone polymers comprising the recurring units of Formula:

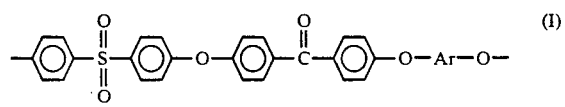
(I)

wherein Ar is phenylene, biphenylene or

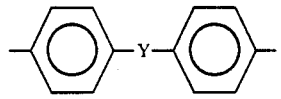

in which —Y— represents

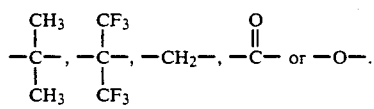

2. The polysulfoneetherketone polymers of claim 1, wherein the reduced viscosity thereof is 0.1 to 1.2.

3. The polysulfoneetherketone polymers of claim 1, wherein the recurring units are

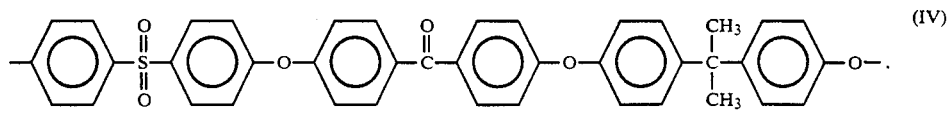
(IV)

4. The polysulfoneetherketone polymers of claim 1, wherein the recurring units are

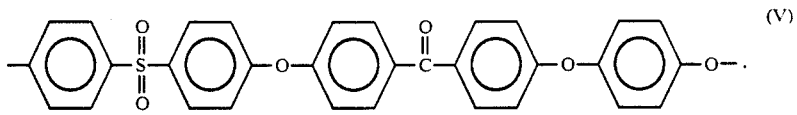
(V)

5. The polysulfoneetherketone polymers of claim 1, wherein the recurring units are

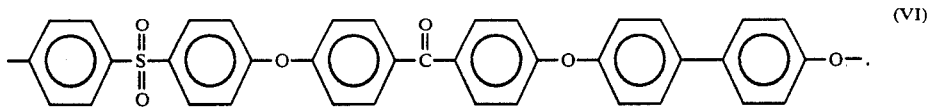
(VI)

6. A process for preparing polysulfoneetherketone polymers having the recurring units of Formula:

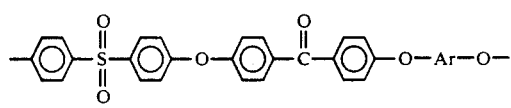
(I)

wherein Ar is phenylene, biphenylene or

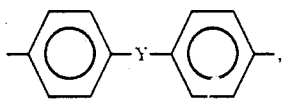

in which —Y— represents

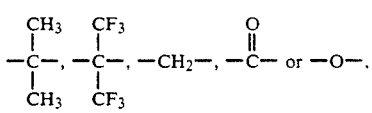

in which equivalent amounts of an aromatic dihalide of Formula:

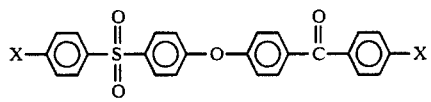
(II)

wherein X is chlorine or fluorine, and an aromatic diolate of Formula:

$$M-O-Ar-O-M \qquad (III)$$

wherein M is an alkali metal, are condensed in an organic polar solvent at a temperature ranging from 140° to 250° C.

7. The process of claim 6, wherein the aromatic dihalide is 4-fluoro-4'-(4-fluorobenzoylphenyloxy)diphenylsulfone.

8. The process of claim 6, wherein the aromatic diolate is resulted from the reaction of an aromatic diol and an alkali metal base.

9. The process of claim 8, wherein the aromatic diol is selected from the group consisting of 2,2-bis(4-hydroxyphenyl)-propane, hydroquinone and 4,4'-biphenol.

10. The process of claim 8 or 9, wherein potassium carbonate is used as an alkali metal base in an amount of 1.0 to 20% by weight in excess with respect to the aromatic diol.

11. The process of claim 6, wherein the organic polar solvent is selected from the group consisting of dimethylsulfoxide, sulfolan and diphenylsulfone.

12. The process of claim 6, wherein the content of water in the reaction mixture is adjusted to 0.5% by weight or below with respect to the aromatic diolate.

13. The process of claim 6, wherein the reaction is completed within 1 to 12 hours.

* * * * *

UNITED STATES PATENT AND TRADEMARK OFFICE
CERTIFICATE OF CORRECTION

PATENT NO. : 5,166,305
DATED : November 24, 1992
INVENTOR(S) : Han et al.

It is certified that error appears in the above-indentified patent and that said Letters Patent is hereby corrected as shown below:

On the title page, under item [19], change "Park et al." to --Han et al.--.

On the title page, at "[75] Inventors:" replace the listed inventors with --Yang K. Han, Seoul; Young H. Kim, Seoul; Sung D. Chi, Seoul; Jong W. Park, Seoul; In T. Lee, Suwon; all of Republic of Korea--.

Column 4, line 26; "tour" should read --four--.

Column 5, line 18; insert --%-- after the numeral "0.5".

Column 5, line 50; "5020C" should read --50°C--.

Signed and Sealed this

Fourth Day of January, 1994

BRUCE LEHMAN

Attest:

*Attesting Officer*

*Commissioner of Patents and Trademarks*